United States Patent [19]

Fredette et al.

[11] Patent Number: 4,931,268
[45] Date of Patent: * Jun. 5, 1990

[54] PRODUCTION OF CHLORINE DIOXIDE

[75] Inventors: Maurice C. J. Fredette; Ching-Shi Yang, both of Mississauga, Canada

[73] Assignee: Tenneco Canada Inc., Islington, Canada

[*] Notice: The portion of the term of this patent subsequent to Aug. 14, 2001 has been disclaimed.

[21] Appl. No.: 399,398

[22] Filed: Aug. 28, 1989

Related U.S. Application Data

[63] Continuation of Ser. No. 938,994, Dec. 8, 1986, abandoned, which is a continuation-in-part of Ser. No. 649,923, Sep. 13, 1984, Pat. No. 4,627,969.

[51] Int. Cl.$^5$ .............................................. C01B 11/02
[52] U.S. Cl. .................................................... 423/479
[58] Field of Search ................... 423/478, 479; 204/95

[56] References Cited

U.S. PATENT DOCUMENTS

| | | |
|---|---|---|
| 3,427,236 | 2/1969 | Scholander et al. ............... 423/478 |
| 4,156,713 | 5/1979 | Fuller ................................... 423/479 |
| 4,465,658 | 8/1984 | Fredette ............................... 423/478 |
| 4,473,540 | 9/1984 | Fredette ............................... 423/478 |
| 4,627,969 | 12/1986 | Fredette et al. .................... 423/478 |

Primary Examiner—Jeffrey E. Russel
Attorney, Agent, or Firm—Sim & McBurney

[57] ABSTRACT

Chlorine dioxide is generated at high efficiency from feeds of chlorate cell liquor, sulphuric acid and methanol by a hybrid of reaction of sodium chlorate with sulphuric acid and methanol and reaction of sodium chlorate with sulphuric acid and sodium chloride. The reaction medium is maintained at its boiling point under a subatmospheric pressure while sodium sesquisulphate precipitates from the reaction medium.

13 Claims, 1 Drawing Sheet

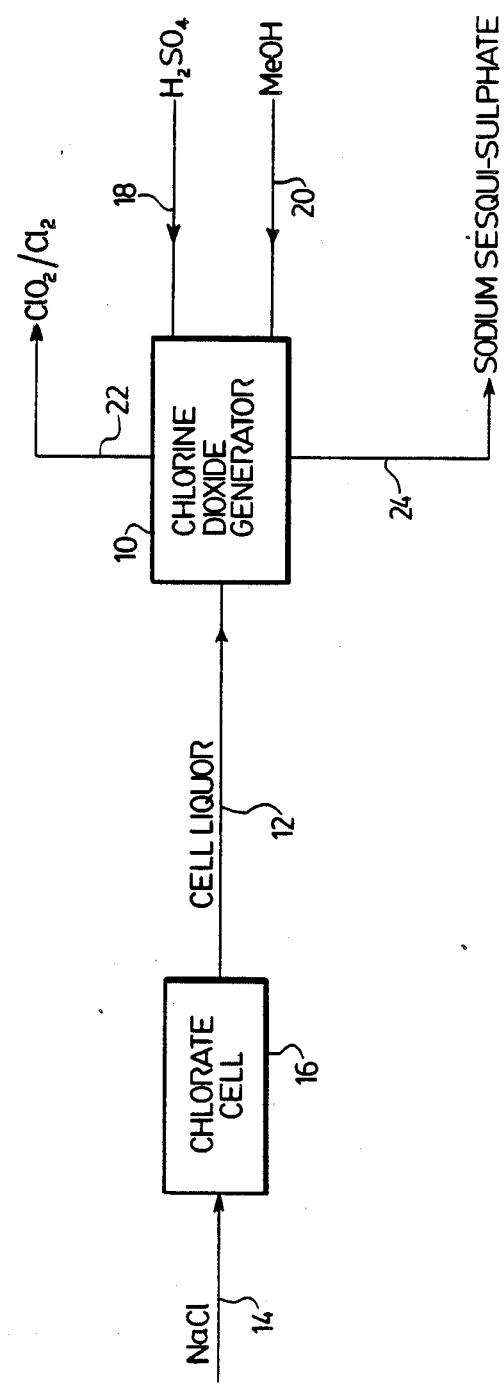

PRODUCTION OF CHLORINE DIOXIDE

This is a continuation of co-pending application Ser. No. 938,994 filed Dec. 8, 1986, now abandoned, which itself is a continuation-in-part of U.S. Ser. No. 649,923 filed Sept. 13, 1984, now U.S. Pat. No. 4,627,969.

FIELD OF INVENTION

The present invention relates to the production of chlorine dioxide using a mixture of reductants.

BACKGROUND TO THE INVENTION

In U.S. Pat. No. 4,081,520, assigned to the assignee hereof, the disclosure of which is incorporated herein by reference, there is described the production of chlorine dioxide at high efficiency, i.e., greater than about 95% conversion, preferably at least about 98% conversion, of chlorate to chlorine dioxide, by the reaction of sodium chlorate with methanol in the presence of sulphuric acid in an aqueous reaction medium having a total acid normality of at least about 9 normal and which is maintained at its boiling point under a subatmospheric pressure. The process is operated continuously with chlorine dioxide being removed from the reaction zone in gaseous admixture with steam, aqueous sodium chlorate, methanol and sulphuric acid being fed to the reaction zone, and sodium acid sulphate precipitating in the reaction zone. This process is known as and referred to hereinafter as the "R8" process.

In U.S. Pat. No. 4,473,540, assigned to the assignee hereof, the disclosure of which is incorporated herein by reference, there is described a modification of the latter process wherein, under plant conditions, the total acid normality may range down to about 7 normal. In U.S. Pat. No. 4,465,658, assigned to the assignee hereof, the disclosure of which is incorporated herein by reference, there is described a further modification of the above-described process, wherein small quantities of chloride ions are continuously fed to the reaction medium in addition to the other reactants, so as to avoid the incidence of random periodic loss of chlorine dioxide production. The present invention also relates to a modification of the above-described R8 process.

It is also known from U.S. Pat. No. 2,863,722, assigned to the assignee hereof, the disclosure of which is incorporated herein by reference, to produce chlorine dioxide at high efficiency by reaction of sodium chlorate, sodium chloride and sulphuric acid at high acid normalities above about 5 normal. This process is known as and referred to hereinafter as the "R2" process. As described in Canadian Patent No. 825,084 to the assignee hereof, the disclosure of which is incorporated herein by reference, the reaction medium for the R2 process may be maintained at its boiling point while a subatmospheric pressure is applied to the reaction zone.

All processes for the generation of chlorine dioxide from sodium chlorate proceed in accordance with the equation:

$$ClO_3^- + Cl^- + 2H^+ \rightarrow ClO_2 + \tfrac{1}{2}Cl_2 + H_2O \qquad (1)$$

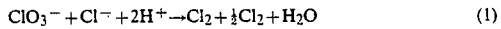

There is a competing reaction which produces only chlorine in accordance with the equation:

$$ClO_3^- + 5Cl^- + 6H^+ \rightarrow 3Cl_2 + 3H_2O \qquad (2)$$

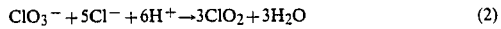

The extent to which chlorate ions are reacted by equation (1) to produce chlorine dioxide is the efficiency of the process, which is expressed as a percentage.

In the R8 process, the chloride ions for the reaction of equations (1) and (2) are produced in situ by reduction of the co-produced chlorine by the methanol reactant. The gaseous product stream consists mainly of chlorine dioxide with small amounts of chlorine. In the R2 process, the chloride ions for the reactions of equations (1) and (2) are added from an external source in the form of sodium chloride. As a result, the gaseous product stream contains substantial quantities of chlorine.

Studies have determined that the R8 process is best described by the following equations:

$$30NaClO_3 + 20H_2SO_4 + 12CH_3OH \rightarrow 30ClO_2 + 10Na_3H(SO_4)_2 + 23H_2O + 5CH_3OH + 6HCOOH + CO_2 \qquad (3)$$

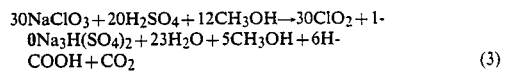

$$12NaClO_3 + 8H_2SO_4 + 6CH_3OH \rightarrow 6ClO_2 + 3Cl_2 + 18H_2O + 6CO_2 + 4Na_3H(SO_4)_2 \qquad (4)$$

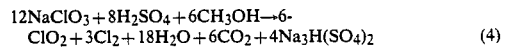

where equation (3) is the efficient process corresponding to equation (1) and equation (4) is the inefficient process corresponding to equation (2). A factor which promotes the efficient reaction of equation (3) is a concentration of sodium chlorate of above 1 molar, and efficiencies in excess of about 95%, usually at least about 97%, are attained.

Studies also have determined that the R2 process is best described by the following equations:

$$NaClO_3 + NaCl + H_2SO_4 \rightarrow ClO_2 + \tfrac{1}{2}Cl_2 + H_2O + Na_2SO_4 \qquad (5)$$

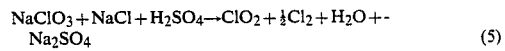

$$NaClO_3 + 5NaCl + 3H_2SO_4 \rightarrow 3Cl_2 + 3H_2O + 3Na_2SO_4 \qquad (6)$$

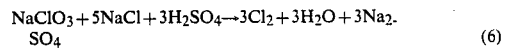

where equation (5) is the efficient process corresponding to equation (1) and equation (6) is the inefficient process corresponding to equation (2). This process usually operates at a chlorate concentration of about 0.2 molar in the reaction medium to maintain the production rate under control. The kinetics of chlorine dioxide production by this process is proportional to $[H^+]^4[ClO_3^-]^2[Cl^-]^2$.

Sodium chlorate for reaction to form chlorine dioxide is formed by electrolysis of sodium chloride solution. In such an electrolysis process, not all the sodium chloride feed is electrolyzed and hence the sodium chlorate solution which results contains unreacted sodium chloride. This solution of sodium chlorate and sodium chloride is commonly termed "cell liquor" and the latter term is used herein to refer to such solution. For use in the conventional R8 process, the sodium chlorate is crystallized from the electrolysis product solution and then redissolved in water to provide the required concentration of sodium chlorate feed solution. For use in the R2 process, a similar crystallization and redissolution may be effected or the cell liquor may be supplemented with sodium chloride to the required feed concentration.

In the marketplace, sodium chlorate is available not only in the form of sodium chlorate crystals but also as cell liquor. In addition, in some pulp mills, cell liquor is produced on site. To increase the flexibility of choice of raw material supplies it often is desirable to use cell liquor directly in the production of chlorine dioxide.

It has previously been thought, however, that it was not possible to use cell liquor as a feed to the R8 process for the following reasons. Firstly, as noted earlier, a concentration of at least 1 molar sodium chlorate is desirable in the reaction medium to promote efficient chlorine dioxide production by the R8 process. This requirement is not compatible with maintaining about 0.2M chlorate ion for control over the production of chlorine dioxide by the R2 process. Secondly, cell liquor usually contains sodium dichromate, added to the sodium chloride solution to assist in the efficiency of electrolysis, and in the presence of reducing agents, such as methanol and chloride ions, $Cr^{VI}$ is rapidly reduced to $Cr^{III}$. It is known from an article entitled "ERCO R7 ClO$_2$ Generator Helps Balance Pulp Mill Chemical Supply" by M. C. J. Fredette (one of the inventors herein), reported in Pulp & Paper Canada 85:1 (1984) pp T17 and 18, that the presence of $Cr^{III}$ in the chlorine dioxide generating process described in U.S. Pat. No. 4,086,329, assigned to the assignee hereof, the disclosure of which is incorporated herein by reference, causes major disturbances to chlorine dioxide generation. The $Cr^{III}$, at levels of 200 to 300 ppm incorporated in the salt cake, acts as a nucleating site for both neutral and acidic sodium sulphates and very fine, difficult to filter, crystals are produced which thicken the reaction medium and prevent normal chlorine dioxide gas release.

It was thought, therefore, that, if typical cell liquor containing 600 gpl NaClO$_3$ and 100 gpl NaCl were attempted to be used as feed for the R8 chlorine dioxide generator, then the resulting chlorine dioxide generating process, wherein approximately 70% of the chlorate ions would react with methanol by the R8 process and approximately 30% of the chlorate ions would react with chloride ions by the R2 process, there would result an uncontrolled process, beset by the problems of the presence of $Cr^{III}$ if the cell liquor contained sodium dichromate.

SUMMARY OF INVENTION

It has, however, surprisingly been found that cell liquor may be fed to a chlorine dioxide generator operating in accordance with the R8 process while maintaining high efficiency and reaction control. When the cell liquor is fed to the reaction medium, the concentration of the chloride ion surprisingly drops to a controlling level. In addition, it has surprisingly been found that, when the cell liquor contains sodium dichromate, the by-product sodium sesquisulphate crystals precipitating from the reaction medium are not substantially smaller as a result of the presence of $Cr^{III}$ but instead incorporate a minor amount of NaHSO$_4$ which raises the acidity, expressed as H$_2$SO$_4$, of the salt cake from 18.7% to about 22 to 24%, an acceptable acid loss.

The surprising finding that it is possible to form chlorine dioxide under controlled conditions from a mixed reductant feed of methanol and chloride ions when cell liquor is fed to the reaction medium leads to the possibility to form chlorine dioxide from sodium chlorate over a wide range of relative proportions of methanol and chloride ions and to the possibility to feed sodium chlorate and sodium chloride separately.

In accordance with the present invention, there is provided a process for the production of chlorine dioxide in a reaction zone. Sodium chlorate, sodium chloride, methanol and sulphuric acid are fed to a reaction zone containing an aqueous acid reaction medium having a total acid normality of about 7 to about 12 normal, preferably about 9 to about 10 normal. The reactants are fed at such individual feed rates as to permit the generation of chlorine dioxide and chlorine at high efficiency from the reaction medium by reaction from about 1 to about 99% by reaction between the fed sodium chlorate, methanol and sulphuric acid and about 99 to about 1% by reaction between the fed sodium chlorate, sodium chloride and sulphuric acid. The reaction medium is maintained at its boiling point while a subatmospheric pressure is applied to the reaction zone. The generated chlorine dioxide and chlorine are removed from the reaction zone in gaseous admixture with steam. A sodium acid sulphate is precipitated from the reaction medium once the reaction medium becomes saturated therewith after start-up.

The sodium chlorate may be fed as an aqueous solution having a concentration of about 3.5 to about 6.5 molar. NaClO$_3$, preferably about 4 to about 5 molar, the sodium chloride may be fed as an aqueous solution having a concentration of about 1 to about 3.5 molar NaCl, preferably about 1.5 to about 2 molar, preferably as a single aqueous solution of sodium chlorate and sodium chloride, with the molar ratio of sodium chlorate to sodium chloride being about 1:1 to about 6.5:1, preferably about 2:1 to about 3.5:1.

GENERAL DESCRIPTION OF INVENTION

The feed of sodium chlorate to the reaction medium produces a concentration therein which corresponds to the feed rate of sodium chlorate thereto. In the conventional type of chlorine dioxide-generating process in which sodium chloride is the reductant, such as the R2 process described above, the sodium chloride concentration in the reaction medium corresponds to the feed rate. However, surprisingly, in the present invention when a mixture of methanol and sodium chloride is employed, the sodium chloride concentration is not controlled by the feed rate but rather assumes a reaction rate-controlling concentration, usually in the range of about 0.001 to about 0.3 molar.

Accordingly, the aqueous reaction medium usually has a chlorate ion concentration of about 0.5 to about 3.5 molar, preferably about 1 to about 2 molar, controlled by the feed rate of sodium chlorate solution to the reaction medium and the aqueous reaction medium usually has a chloride ion concentration of about 0.001 to about 0.2 molar which is uncontrolled by and independent of the feed rate of the sodium chloride to the aqueous reaction medium.

In the present invention, chlorine dioxide and chlorine are generated at high efficiency from the reaction medium from about 1 to about 99% by reaction between the fed sodium chlorate, methanol and sulphuric acid and from about 99 to about 1% by reaction between the fed sodium chlorate, sodium chloride and sulphuric acid.

Usually, operation at the extreme ends of these ranges is not of commercial significance and hence is preferred to generate chlorine dioxide and chlorine from the reaction medium about 40 to about 95% by reaction between the fed sodium chlorate, methanol and sulphuric acid and from about 60 to about 5% by reaction between the fed sodium chlorate, sodium chloride and sulphuric acid.

In the present invention, the fed sodium chlorate produces chlorine dioxide and chlorine in accordance with equations (1) and (2) above. As is clear from those equations, chlorate ions are reduced by chloride ions. In this invention, the chloride ions are provided partly by the introduction of chloride ions as sodium chloride and partly by reduction of coproduced chlorine by methanol. The relative proportions of methanol and sodium chloride fed to the reaction medium, therefore, control the degree to which chlorine dioxide is produced by the respective reactions.

The reaction medium is maintained at its boiling point while a subatmospheric pressure is applied thereto resulting in removal of the generated chlorine dioxide and chlorine from the reaction medium in gaseous admixture with steam and precipitation of a sodium acid sulphate, often in the form of sodium sesquisulphate, from the reaction medium once the reaction medium becomes saturated therewith after start up. The precipitated sodium acid sulphate may be removed from the reaction medium on an intermittent or continuous manner.

The process of the invention, therefore, produces chlorine dioxide at high efficiency by a hybrid of the R8 and R2 processes. The conditions favouring efficient chlorine dioxide production by the R8 process are maintained while the R2 process is maintained under control. As noted earlier, highly efficient (i.e. above 95%) chlorine dioxide production by the R8 process is provided by dissolved chlorate ion concentration above about 1 molar. However, lower chlorate ion concentration in the reaction medium down to about 0.5 molar may be utilized in the process of the invention, albeit at the penalty of a lower efficiency.

Upon starting up the process, the R2 process reaction is very rapid at the high levels of chlorate ion and chloride ion initially prevailing (say, 2M $NaClO_3$, 0.6M NaCl) and this rapid reaction depletes the reactants to a much lower level (say, 1.5M $NaClO_3$, 0.01M NaCl) at which the R2 process is under control, even though a relatively high (for the R2 process) chlorate ion concentration is present. Thereafter, the R2 portion of the process is controlled by the feed rate of chloride ions in the cell liquor. An alternative start up procedure is initially to feed cell liquor but no methanol to the generator for a while until the chlorate ion concentration rises above 1 molar while the chloride ion concentration remains at a low level, whereupon methanol feed may be commenced.

The invention which is involved in the above-mentioned U.S. Pat. No. 4,465,658 is the deliberate addition of sodium chloride to avoid the periodic random loss of production. The addition of such chloride ion necessarily results in some reduction of sodium chlorate and the formation of chlorine dioxide and chlorine. However, the amount of sodium chloride typically employed in that process results in, at most, 1 to 2% of the chlorine dioxide production occurring by reduction of sodium chlorate, sodium chloride and sulphuric acid. There is no intention in the earlier patent to use the added chloride as a chlorine dioxide-generating reactant but rather the added chloride ensures that periodic random loss of production cannot occur since chloride ions are always present in the reaction medium. There is no suggestion to employ higher amounts of chloride ion nor that it may be possible to use cell liquor as a reactant feed to an R8-type process.

In addition to the sodium chlorate, sodium chloride and sulphuric acid, methanol also is fed to the reaction medium. Such methanol may be fed, either as pure methanol, or, more usually, as an aqueous solution thereof, which may contain at least about 20 wt. % MeOH, preferably at least about 30 wt. % MeOH. The quantity of methanol fed to the reaction medium is sufficient to maintain, in combination with the chloride ion, efficient chlorine dioxide production having regard to the feed rate of sodium chlorate to the reaction medium.

The sodium chlorate and sodium chloride feed solution used in this invention preferably has a sodium chlorate concentration of about 4 to about 5.5 molar and a sodium chloride concentration of about 2 to about 1.5 molar and this preferred sodium chlorate and sodium chloride solution usually is constituted by cell liquor from the electrolytic production of sodium chlorate by electrolysis of sodium chloride. Cell liquor typically contains about 600 gpl $NaClO_3$ and 100 gpl NaCl.

The feed rates of the reactants to the reaction zone are preferably sufficient to provide in the reaction medium a chlorate ion concentration of about 1 to about 2 molar and a total acid normality of about 9 to about 10 normal.

The reaction medium is maintained at its boiling point at a temperature usually in the range of about 60° to about 80° C., preferably about 65° to about 75° C., while a subatmospheric pressure is applied thereto usually in the range of about 60 to about 300 mm Hg, preferably about 90 to about 120 mm Hg.

BRIEF DESCRIPTION OF DRAWING

FIG. 1 of the accompanying drawing is a schematic sheet of one embodiment of the invention.

DESCRIPTION OF PREFERRED EMBODIMENT

Referring to the drawing, a chlorine dioxide generator 10 is operated at the boiling point of the aqueous acid reaction medium while a subatmospheric pressure is applied thereto. Cell liquor comprising an aqueous solution of sodium chlorate and sodium chloride is fed to the generator 10 by line 12. The cell liquor in line 12 is formed by electrolysis of sodium chloride solution in line 14 in a chlorate cell 16. The cell liquor in line 12 may contain sodium dichromate, if such is added to the chlorate cell 16 to assist in electrolysis of the sodium chloride solution in line 14.

Sulphuric acid is fed to the chlorine dioxide generator 10 by line 18, usually as an aqueous 93% $H_2SO_4$ feed, while methanol is fed to the chlorine dioxide generator by line 20.

The cell liquor, sulphuric acid and methanol are continuously fed to the chlorine dioxide generator 10 at flow rates sufficient to maintain an aqueous acid reaction medium producing chlorine dioxide and chlorine by a hybrid of the R8 process and the R2 process, preferably approximately 70% by the R8 process and approximately 30% by the R2 process.

Chlorine dioxide and chlorine are generated at high efficiency from the reaction medium and are removed from the chlorine dioxide generator 10 by line 22 in admixture with steam formed by boiling the reaction medium. Gaseous by-products from the R8 process, including carbon dioxide and formic acid, also are present in the gaseous product stream 22. The product gas stream in line 22 may be processed in any convenient manner to form an aqueous solution of chlorine dioxide for use in pulp mill or other bleaching operations.

The chlorine dioxide-generating processes which are carried out in the generator 10 produce sodium sesquisulphate ($Na_3H(SO_4)_2$) as a by-product which precipitates from the reaction medium, once the reaction medium reaches saturation after start-up. The crystalline sodium sesquisulphate may be removed from the chlorine dioxide generator 10 by line 24 either continuously or intermittently. If desired, the sodium sesquisulphate product may be treated to recover the acid values therefrom, as described in U.S. Pat. No. 4,325,934, assigned to the assignee hereof, the disclosure of which is incorporated herein by reference.

When the cell liquor in line 12 contains sodium dichromate, the precipitated sodium sesquisulphate usually contains some sodium bisulphate, which increases the acid content of the by-product removed by line 24.

The chlorine dioxide generator 10, therefore, produces chlorine dioxide and chlorine at high efficiency from cell liquor, sulphuric acid and methanol in a combination of the R8 and R2 processes.

EXAMPLE

Chlorine dioxide was produced from a boiling aqueous acid reaction medium at 68° C. while an absolute pressure of 120 mm Hg was applied thereto. Sodium chlorate, methanol and sulphuric acid were continuously fed to the reaction during the run. Several runs were made, wherein the sodium chlorate was fed as an aqueous solution made up from sodium chlorate and sodium chloride simulating cell liquor and from which sodium dichromate was absent, and as an aqueous solution of sodium chlorate and sodium chloride simulating cell liquor and containing sodium dichromate. The results obtained were compared with those reported in U.S. Pat. No. 4,081,520.

The reactants, feed rates and reaction medium conditions for the runs are set forth in the following Table I along with the data from U.S. Pat. No. 4,081,520:

TABLE I

|  | U.S. Pat. No. 4,081,520 (1) | Run No. 1 | Run No. 2 |
|---|---|---|---|
| Reactants: | 6.74 M NaClO$_3$ | 586 gpl NaClO$_3$ | 586 gpl NaClO$_3$ |
|  | 9 M H$_2$SO$_4$ | 80 gpl NaCl | 80 gpl NaCl |
|  | 30% v/v MeOH | 30 N H$_2$SO$_4$ | 1.5 gpl Na$_2$Cr$_2$O$_7$.2H$_2$O |
|  |  | 33% v/v MeOH | 30 N H$_2$SO$_4$ |
|  |  |  | 33% v/v MeOH |
| Feed Rate (ml/min): |  |  |  |
| —NaClO$_3$ solution | 10.5 | 10 | 10 |
| —H$_2$SO$_4$ | 3.6 | 2 | 2 |
| MeOH | 3.4 | 2 | 2 |
| Reaction Medium: |  |  |  |
| Chlorate ion con.(M) | 1.1 | 1.45 | 1.42 |
| Chloride ion con.(M) | 0.003$^{(2)}$ | 0.049 | N.D. |
| Acid concentration(N) | 9.3 | 10.1 | 8.5 |
| Efficiency: | 99 | 98.1 | 95.2 |

Notes:
(1) Run No. 3 in the Table in this patent
(2) The sodium chlorate feed contained about 0.003 lb. NaCl impurity/lb. of NaClO$_3$ In all instances, therefore, a high efficiency of chlorine dioxide production was achieved. Analysis of precipitated by-product salt revealed the chemical constitution to correspond to sodium sesquisulphate (Na$_3$H(SO$_4$)$_2$) except in the case of Run No. 2 when a minor amount of sodium bisulphate (NaHSO$_4$) was found to be present, raising the acidity (expressed as H$_2$SO$_4$) from 18.7 wt. % to 22 wt.%. In the case of Run No. 2, the reaction medium had a green colour characteristic of the presence of Cr$^{III}$ and the precipitate was found to contain 480 ppm of Cr$^{III}$.

There was no evidence of lack of control of the process in Runs 1 and 2. In Runs 1 and 2, the reaction occurred approximately 75% by the R8 process and approximately 25% by the R2 process, while in the process of U.S. Pat. No. 4,081,520 the reaction ran 100% by the R8 process.

This Example demonstrates that chlorine dioxide can be generated at high efficiency using cell liquor, both in the presence and absence of sodium dichromate.

SUMMARY OF DISCLOSURE

In summary of this disclosure, chlorine dioxide may be prepared at high efficiency from cell liquor by a hybrid of chlorine dioxide generating processes, contrary to the indications of the prior art. Modifications are possible within the scope of the invention.

What we claim is:

1. A process for the production of chlorine dioxide in a reaction zone, which comprises feeding sodium chlorate, sodium chloride, methanol and sulphuric acid to a reaction and zone containing and aqueous acid reaction medium having a total acid normality of about 7 to about 12 normal at such individual feed rates as to permit the generation of chlorine dioxide and chlorine at high efficiency from said reaction medium by reaction from about 1 to about 99% by reaction between the fed sodium chlorate, methanol and sulphuric acid and about 99 to about 1% by reaction between the fed sodium chlorate, sodium chloride and sulphuric acid, maintaining said reaction medium at its boiling point while a subatmospheric pressure is applied to the reaction zone, removing said generated chlorine dioxide and chlorine from said reaction zone in gaseous admixture with steam, and precipitating a sodium acid sulphate from the reaction medium once the reaction medium becomes saturated therewith after start-up.

2. The process of claim 1 wherein said sodium chlorate is fed to the reaction medium as an aqueous solution thereof having a concentration of about 3.5 to about 6.5 molar, said sodium chloride is fed to the reaction medium as an aqueous solution thereof having a concentration of about 1 to about 3.5 molar, and the molar ratio of sodium chlorate to sodium chloride fed to the reaction medium is about 1:1 to about 6.5:1.

3. The process of claim 2 wherein said sodium chlorate and sodium chloride are fed as a single aqueous solution thereof.

4. The process of claim 3 wherein said single aqueous solution of sodium chlorate and sodium chloride has a sodium chlorate concentration of about 4 to about 5 molar, a sodium chloride concentration of about 1.5 to about 2 molar, and a molar ratio of sodium chlorate to sodium chloride of about 2:1 to about 3.5:1.

5. The process of claim 4 wherein said aqueous solution of sodium chlorate and sodium chloride is cell liquor produced by electrolysis of aqueous sodium chlorate solution.

6. The process of claim 5 wherein said cell liquor contains about 600 gpl NaClO$_3$ and about 100 gpl NaCl.

7. The process of claim 2 wherein the aqueous acid reaction medium has a chlorate ion concentration of about 0.5 to about 3.5 molar controlled by the feed rate of said sodium chlorate solution to the reaction medium and the aqueous acid reaction medium has a chloride ion concentration of about 0.001 to about 0.2 molar which is uncontrolled by and independent of the feed rate of said sodium chloride solution to the aqueous acid reaction medium.

8. The process of claim 7 wherein said reaction medium has a sodium chlorate concentration of from about 1 to about 2 molar.

9. The process of claim 8 wherein said reaction medium has a total acid normality of from about 9 to about 10 normal.

10. The process of claim 7 wherein said reaction medium is maintained at a boiling temperature of about 60° to about 80° C. while an absolute pressure of about 60 to about 300 mm Hg is applied to the reaction zone.

11. The process of claim 10 wherein said reaction medium is maintained at a boiling temperature of about 65° to about 75° C. while an absolute pressure of about 90 to about 120 mm Hg is applied to the reaction zone.

12. The process of claim 1 wherein chloride dioxide and chlorine are generated from said reaction medium about 40 to about 90% by reaction between the fed sodium chlorate, methanol and sulphuric acid and from about 60 to about 5% by reaction between the fed sodium chlorate, sodium chloride and sulphuric acid.

13. The process of claim 12 wherein said first proportion is about 50 to about 80% and the second proportion is about 50 to 20%.

* * * * *